United States Patent Office 3,424,178
Patented Jan. 28, 1969

3,424,178
SMALL SIZE CONSTRUCTIONS WHICH ARE
READILY FABRICATED OR DISMANTLED
Yoshimi Yazaki, Nakamaru-cho 9, Itabashi-ku,
Tokyo, Japan
Filed Nov. 1, 1966, Ser. No. 591,226
Claims priority, application Japan, Nov. 4, 1965,
40/67,660; July 22, 1961, 41/69,551; July 22,
1966, 41/69,552; Aug. 3, 1966, 41/73,552; Aug. 3,
1966, 41/73,553; Aug. 3, 1966, 41/73,556; Aug. 8,
1966, 41/74,990; Sept. 8, 1966, 41/84,712
U.S. Cl. 135—1                                     2 Claims
Int. Cl. A45f 1/00, 1/16

ABSTRACT OF THE DISCLOSURE

A demountable construction including a joint member having a socket, a frame member insertable in the socket and provided with an elongated projection which interlocks in a notch provided in the joint member, a ridge on the joint member and in line with the projection in its interlocked position, a sheet covering overlying the projection and the ridge and a single resilient clamp resiliently secured to both the projection and the ridge and securing the covering thereto.

---

The present invention relates to constructions which can be readily fabricated or dismantled and which can be built at any desired place and which can function in compliance with the objects and the uses. More specifically, the present invention relates to small size constructions which can be readily fabricated or dismantled for transportation by all those who desire to use them without requiring the services of professional craftsman. To these ends, the present invention contemplates the provision of small size constructions which have a framework comprising a plurality of pipes and joint members of various shapes all made with synthetic material so designed as to be easily coupled together or separated apart from each other for being bundled or packed easily for transportation whenever necessary and which permit coverings to be readily attached to or detached from the framework which defines the respective areas of the walls, ceilings, roofs and partitions. To said ends, the present invention also contemplates the provision of small size constructions which can be readily fabricated or dismantled and which have a framework light in weight but excellent in mechanical strength and which function so as to meet any object and use no matter where the constructions are set up.

There has been a strong demand for the development of constructions which can be readily fabricated or dismantled for use as small, convenient and simple houses to be installed in various resort areas, or as small-scale green houses having sheet coverings made of a synthetic resin material for growing or cultivating various agricultural plants and crops, or as small-scale sheds for drying laundries, or as garages for automobiles, or as warehouses for storing articles, or terraces for shading sunlight or rainfall (such constructions will hereinafter to be referred to simply as small size constructions). To meet these demands, several attempts have been made which include the provision of small size constructions made, principally, of steel or iron frames or made of wood frames. The former being of such a weight that no one can easily fabricate a house frame therewith, while the latter is defective in their poor durability. Both the steel and wooden constructions required complicated fabricating operation because they invariably use bolts and nuts as the fastening means, and furthermore, the difficulty which was encountered in the mounting or dismounting of the frame members, in addition to the prohibiting weight of the frame members, has made it difficult to provide constructions made of steel or wood which would satisfy the demands in general.

As has been discussed, there has been a strong demand for the development and for the materialization of small size constructions which are light in weight but great in strength and which can withstand the use of long duration and which can be freely expanded or reduced in size and which can be readily fabricated or dismantled.

It is, therefore, the primary object of the present invention to meet such demands by providing a small size construction which can be readily fabricated or dismantled, said construction having a framework comprising a plurality of pipes made of synthetic resin material and a plurality of joint members also made of synthetic material and having arbitrary angles for being coupled with said pipes made of a resin material and having appropriate required shapes, each of said joint members being provided with portions for receiving the pipes to be coupled therewith, each of said joint members being also provided with a plurality of receiving portions in a number matching that of the ends of the pipes converging to the joint, and also which are so designed as to permit easy attachment or detachment of coverings which are required to cover the desired planes defined by the frames.

Another object of the present invention is to provide a small size construction which can be readily fabricated or dismantled and which are of superior air-tightness or closure by pivotally or movably and detachably mounting auxiliary units, such as doors and windows having frames comprising assembled pipes and joint members made of synthetic resin material and having coverings made of a synthetic resin material mounted on or pinched between them, onto the desired portion of the areas or planes defined by the frames of the entire construction and provided with coverings also made of a synthetic resin material.

Still another object of the present invention is to provide a small size construction which can be readily fabricated or dismantled and which can be expanded or reduced by asembling together the pipes, joint members and coverings which are made of a synthetic resin material, or by locally removing them.

Yet another object of the present invention is to provide a small size construction which can be readily fabricated or dismantled and which permits installation of such construction firmly and securely at any desired site.

A further object of the present invention is to provide a small size construction which can be readily fabricated or dismantled and which are light in weight but excellent in mechanical strength and also in the resistivity to weather, by merely coupling or mounting moulded members together which are principally made of a synthetic resin material.

Other objects and features of the present invention will become apparent by reading the following detailed descriptions by referring to the accompanying drawings which are given simply to illustrate some of the embodiments of the present invention, wherein:

FIGS. 1A–1R shows perspective views of various embodiments of the joint members of the present invention made of synthetic resin material;

FIG. 5A is a perspective view showing one embodiment of the small size construction of the present invention;

FIG. 5B and FIG. 5C are enlarged perspective views, respectively, of a concurrent joint and shaft-fitting member for use as a frame of windows, doors or the like;

FIG. 8 is a perspective view showing another embodiment of the small size construction of the present invention which is intended for use as a terrace or the like;

FIG 9 is a perspective view of still another embodiment of the small size construction of the present invention which is fabricated for use as a garage or like purposes;

FIG. 10 is a perspective view showing yet another embodiment of the small size construction of the present invention which is fabricated for being used as a laundry drying shed or the like;

FIGS. 12 and 13A are perspective views, respectively, showing yet another embodiment of the small size construction of the present invention fabricated for use as agricultural green houses or the like;

FIG. 13B is a perspective view, in an enlarged scale, showing the portion encircled by a dotted line in FIG. 13A;

FIG. 13C is a cross sectional view taken along the line $k$—$k$ in FIG. 13B; and FIGS. 14A through 17B represent perspective views, partly broken away, showing the arrangement for pinching or attaching different coverings made of synthetic resin material onto the plane defined by frame members of the small size construction of the present invention, and also cross sections in an enlarged scale showing the manner in which said attaching or pinching of the covering is effected;

Description will now be made by referring to the drawings.

Figures 1A, 1B, 1C, 1D, 1E, 1F, 1G, 1H, 1I, 1J, 1K, 1L, 1M, 1N, 1O, 1P, 1Q, 1R:
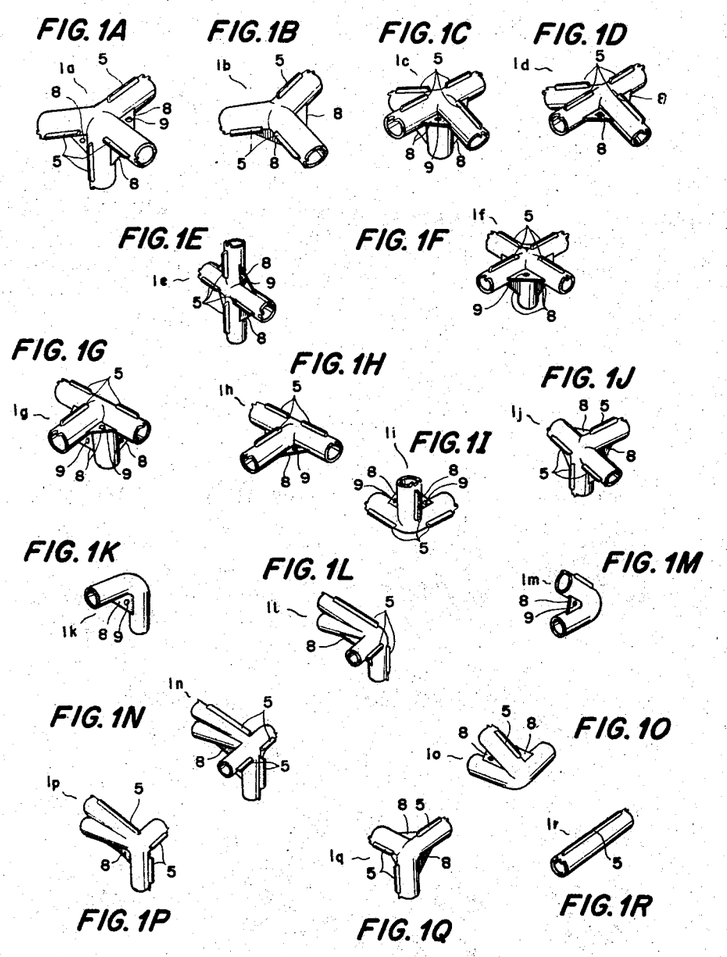

The respective drawings A through R which are contained in FIG. 1 represent, respectively, joint members 1 made of a synthetic resin material for inserting and coupling pipes which are made of synthetic resin and which have been developed as the frame members for use in the small size constructions of the present invention and having appropriate shapes including those extending straight, or those having T-shape, cross-shape, or fork shape including two-forks, three-forks, four-forks and five-forks all of which are so formed as to have branch pipes bending with a sharp angle or with an obtuse angle starting from the portion where the pipes join. Each of these joint members is provided, on the longitudinal surfaces which are brought into contact with a covering 4 and excepting the point of intersection or joining of pipes and excepting a small area or said surfaces close to the respective ends of the extension of said pipes, with projections 5 for pinching or mounting said covering. Also, at the connecting edge of the socket or sockets of each joint member is provided with a non-swivel portion 7 such as a notch or a two-fork projection for receiving the foremost end of the projection 6 provided on a connecting pipe 2, and such non-swivel portion 7 is aligned with and disposed in the same direction with the aforesaid projection 5 of said joint member. Furthermore, a reinforcement rib 8 is provided in the portion of a joint member where two adjacent pipes extending in directions different to each other form an internal angle so that the two adjacent side edges of said rib 8 are in tight contact with the surfaces of these two pipes which form said internal angle. It is to be noted that all of the aforesaid elements of a joint member are integrally formed as a single joint member when the joint member is moulded with a medium hard or hard synthetic material depending on the requirements. Said rib 8 of a joint member is provided, centrally thereof, with a through hole 9 which may be utilized as an engaging hole which enables a wire or the like to securely fasten the hole of one rib of a joint member to the diagonally located hole of a rib of another joint member, or the hole may be utilized for inserting a bolt in case it is intended to attach a wall-plate made of synthetic resin onto the plane of said internal angle. This hole is also integrally formed at the time of molding the joint member.

Of the joint members 1 made of synthetic resin material, the one indicated by 1$a$ is for the connection with principal rafter pipes 2$a$, 2$a$, a ridge-pole pipe 2$b$ and a supporting vertical brace pipe 2$c$; the one indicated by 1$b$ is for the connection with the pipes 2$a$, 2$a$ and 2$b$; the one indicated by 1$c$ is for the connection with the pipes 2$b$, 2$b$, 2$c$ and an inclined rafter pipe 2$d$; the one indicated by 1$d$ is for the connection with the pipes 2$b$, 2$b$ and 2$d$, 2$d$; the one indicated by 1$e$ is for the connection with the pipe 2$c$, the cross frame pipes 2$e$, 2$e$ of the construction and a pillar pipe 2$f$; the one indicated by 1$f$ is for the connection with the pipe 2$c$, a vertical beam pipe 2$g$ and cross-beam pipes 2$h$, 2$h$; the one indicated by 1$g$ is for the connection with a pipe 2$f$, base pipes 2$i$, 2$i$, and an auxiliary base pipe 2$j$; the one indicated by 1$h$ is for the connection with the pipes 2$f$ and 2$i$, 2$i$; the one indicated by 1$i$ is for the connection with the pipes 2$i$, 2$i$ and a pillar pipe 2$k$; the one indicated by 1$j$ is for the connection with the pipes 2$d$, 2$f$ and eaves beam pipes 2$l$, 2$l$; the one indicated by 1$k$ is for the connection with a vertical pipe 2$m$ for forming the frame of a door or a window, and a cross pipe 2$n$; the one indicated by 1$l$ is for the connection with the pipes 2$a$, 2$e$, 2$k$ and 2$l$; the one indicated by 1$m$ is for the connection with the pipe 2$j$ and a pillar reinforcement pipe 2$q$; the one indicated by 1$n$ is for the connection with the pipes 2$d$, 2$f$, 2$h$ and 2$l$, 2$l$; the one indicated by 1$q$ is for the connection with the pipes 2$i$, 2$j$ and 2q; the one indicated by 1p is for the connection with the pipe 2a which is disposed to face 1l, the pipes 2e, 2k and 2l; the one indicated by 1q is for the connection with a horizontal pipe 2p and an inclined pipe 2q; and the one indicated by 1p is for the connection with various pipes 2, 2; and so on. There are joint members (not shown) which are of shapes other than those described above, but they are omitted to simplify the description.

The aforesaid pipes 2 which are made of synthetic resin material include those which are used for desired particular purposes such as the pipe 2r which is used as a brace.

Each of these pipes is provided, on the portion of the surface thereof which is brought into contact with a covering 4 and a little distance away from both end edges of the pipe, with longitudinally extending ridges or elongated projections 6 each having a head-and-neck like cross section for mounting therearound a covering 4 for being pinched thereat, and also each of these pipes contain a reinforcement metal pipe therein which is integrally moulded with said pipe made of a synthetic resin material.

Figure 2A:
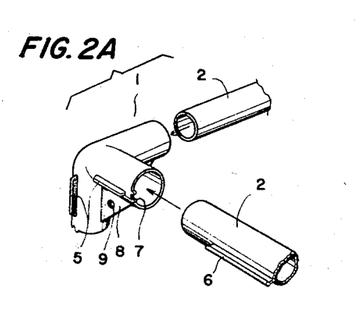
FIGS. 2A–2C, 3A, 3B, 4A and 4B represent perspective views, respectively, in an enlarged scale, showing connections of the pipes and joint members of the present invention both of which are made of a synthetic resin material which, respectively, represent different embodiments of the manner in which said pipes and joint members are connected to each other.
Figure 2B:
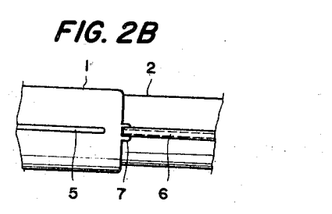
Figures 2C, 3A, 3B:
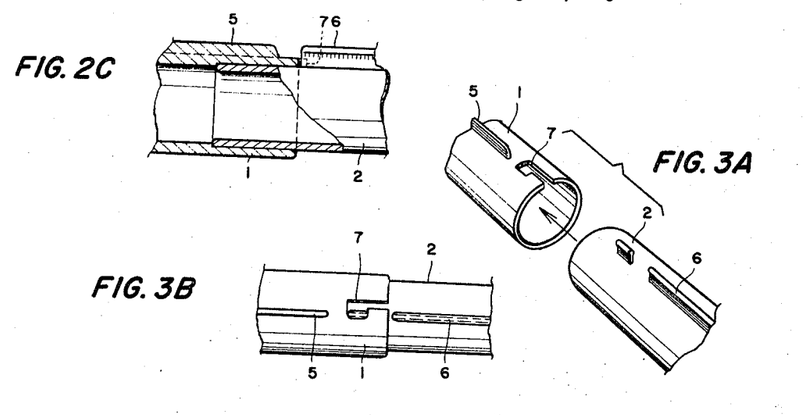
Figures 4A, 4B:
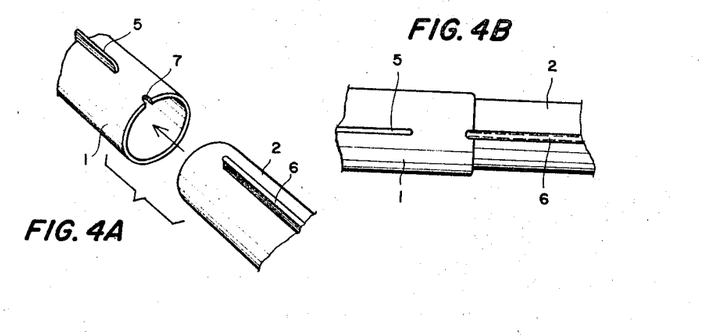

FIGS. 2 through 4 illustrate the manner in which said joint members 1 made of synthetic resin material are coupled with said pipes 2 made also of a synthetic resin material. Because of the arrangement that the foremost end of the elongated projection 6 of a pipe is brought into engagement with the non-swivel means 7 provided in a joint member made of synthetic resin material, said elongated projection 6 of the pipe is brought into alignment with the elongated ridge 5 provided on the joint member when both are coupled together. Furthermore, the arrangement that the elongated projection 6 of the pipe and the elongated ridge 5 of the joint member are given a height such that the top face of the elongated projection 6 of the pipe and the top face of the elongated ridges 5 of the joint member are positioned in the same horizontal plane when both are coupled together, permits the covering 4 to be mounted or pinched positively on and around the projection and ridge and also permits a fixing member 10 to be positively attached thereto when the fixing member is pressed against the projection and the ridge with a covering being sandwiched therebetween. Said fixing member 10 preferably is formed so as to have substantially a horse-shoe cross section with a recessed face for allowing a covering to be pinched therearound to thereby prevent casual detachment of the fixing member from said projection 6 or ridge 5, and these projections and ridges may be formed with a medium hard or hard synthetic resin material as required.

Figures 15A, 15B:
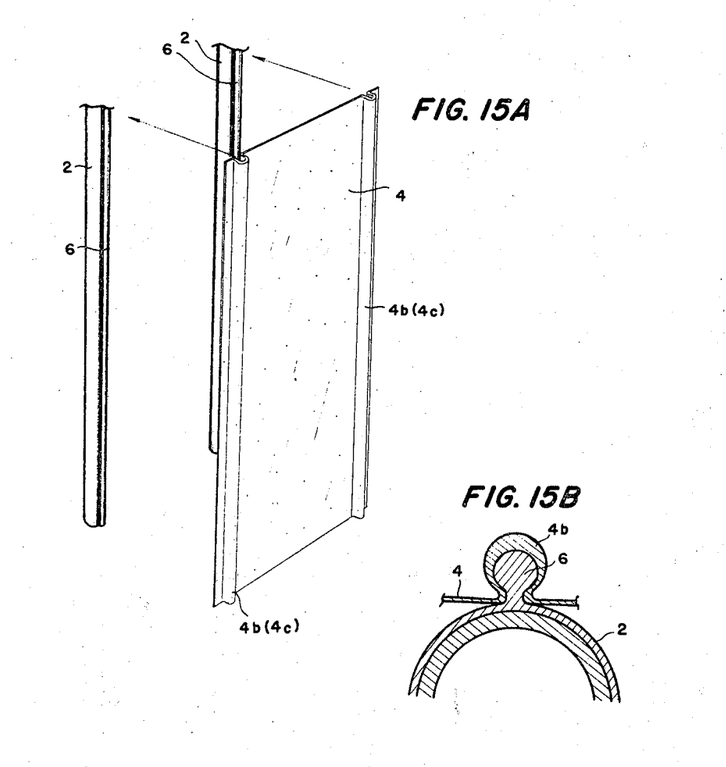
Figure 15C:
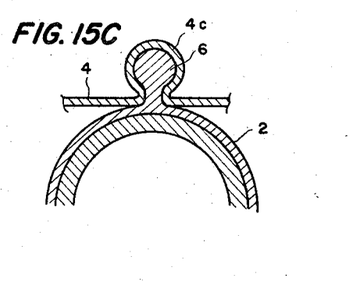
Figures 16A, 16B, 16C:
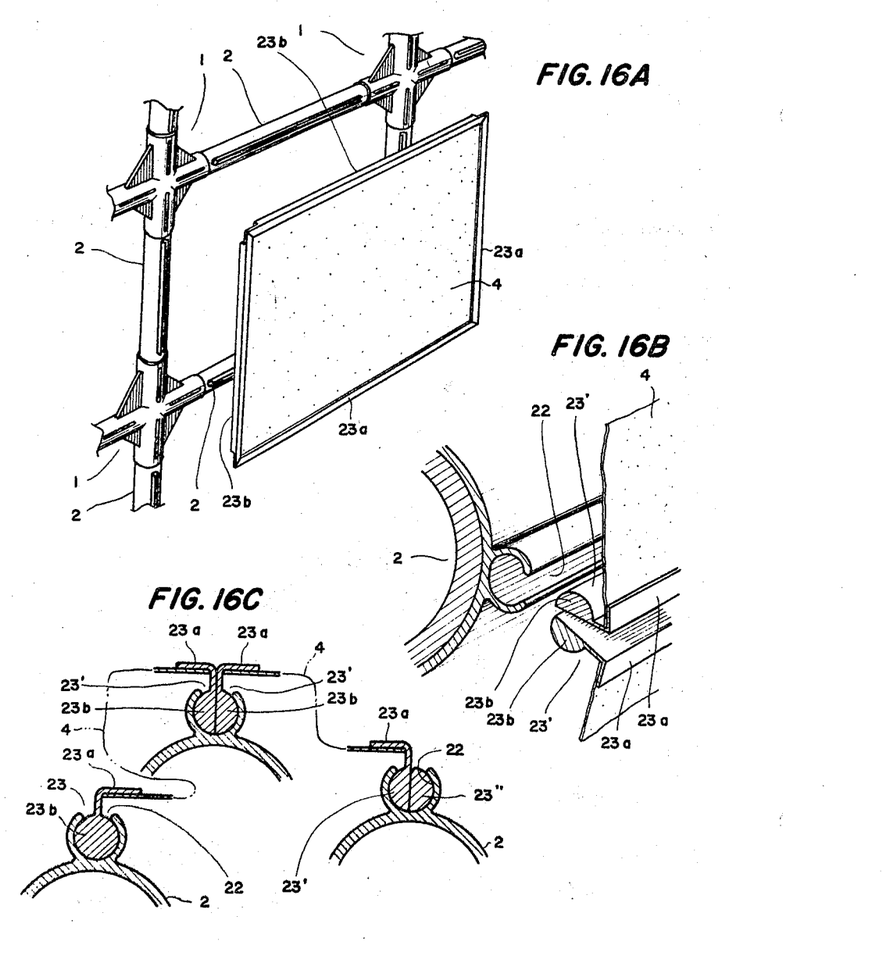

Said covering 4 includes a film-like material, a sheet-like material or a board-like material made of an appropriate synthetic resin material. In case, however, a covering 4 of the type as shown in FIGS. 15 and 16 is used, it is not necessary to attach the aforesaid fixing member 10 thereto. These coverings may be either transparent, translucent or opaque as desired.

Figures 5A, 5B, 5C:
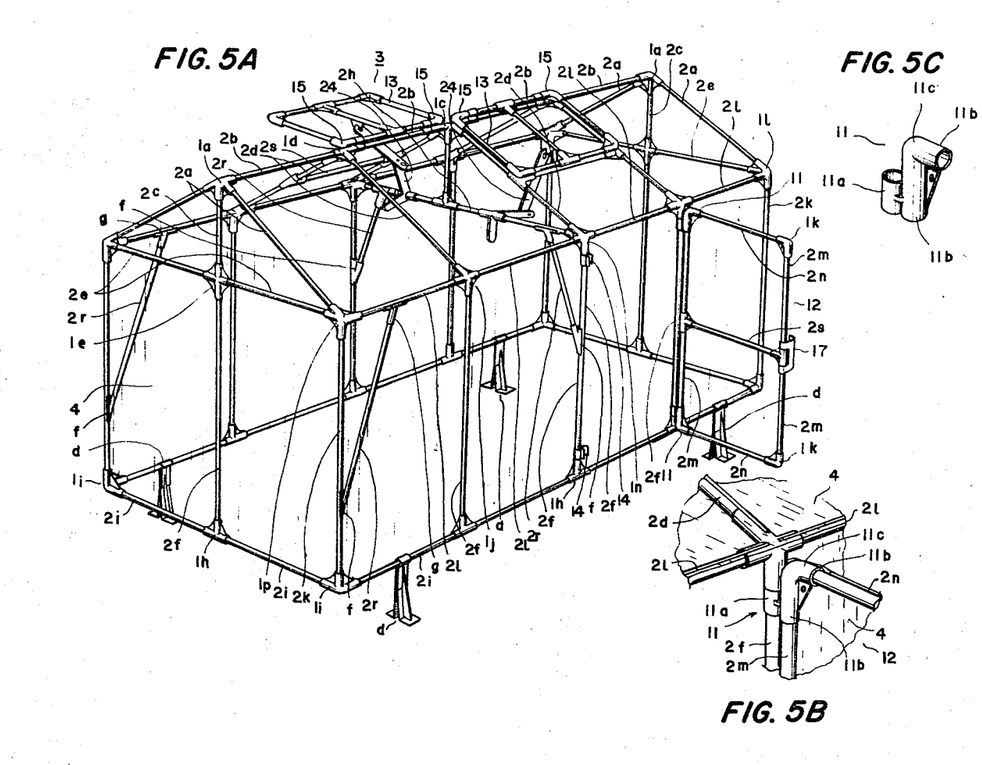

Referring now to FIG. 5, reference numeral 11 represents a concurrent shaft-fixing joint for a door 12 provided for the small size construction 3 shown in FIG. 5. This member 11 comprises a pipe 11a for fixing an appropriate member such as an intermedialy pillar pipe 2f, and further comprises an L-shape pipe 11c having coupling members 11b, 11b at both ends into which a vertical pipe 2m and a cross pipe 2n are inserted, said pipe 11a and said L-shape pipe 11c being integrally formed so that they are disposed adjacent to each other, and this member 11 as a whole is made with a medium hard or hard synthetic resin material as required. This member 11 also serves as a joint member when it is intended to select the pitch of the roof, and it is provided, on the portion of the face which is contacted by a covering 4, with an elongate ridge 5 in the same manner as for other members 1 made of synthetic resin material.

Figure 6:
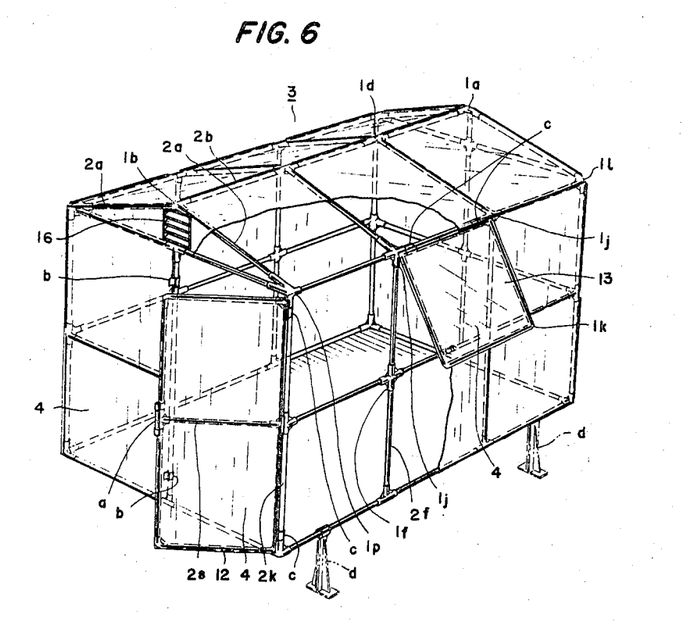
FIG. 6 is a perspective view showin gone embodiment of the small size construction of the present invention for use for an appropriate purpose such as for a hut to be installed in resort areas, a storage house or a green-house for agricultural purposes.
Figures 7A, 7B, 7C:
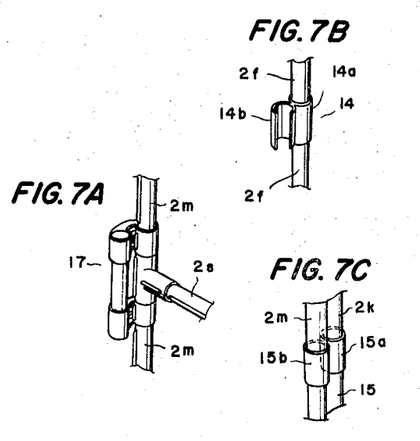
FIG. 7A is a perspective view, in an enlarged scale, showing the door handle indicated at $a$ in FIG. 6.
FIG. 7B is a perspective view, in an enlarged scale, showing a fixing fitting indicated at $b$ in FIG. 6 for fixedly receiving the frame of a door or a window when it is closed.
FIG. 7C is a perspective view, in an enlarged scale, showing a shaft-fixing coupling member indicated at $c$ in FIG. 6 for use in a door or window.

As is seen in FIGS. 6 and 7B, reference numeral 14 represents a fixing fitting for receiving the marginal edge of a window 13 or a door when it is closed. This member 14 comprises a pipe 14a into which one of the following members such as a main pillar pipe 2f, an intermediary pillar pipe 2k or a reinforcement cross pipe 2s securely inserted, and also comprises a pipe 14b having a cut-out for holding a pipe of the frame of said door or said window, and these elements of the member 14 are formed integrally with an appropriate synthetic resin material having resiliency. As such, this fixing fitting 14 can hold the door or the window in a stable, closed state.

As is shown in FIGS. 5, 6 and FIG. 7C, FIG. 7F, reference numeral 15 represents a shaft-fixing coupling fitting which is attached at both ends of a frame member of a door or a window requiring to be coupled to other frame member, and has a structure different from said concurrent shaft-fixing joint member 11. Said shaft-fixing coupling fitting 15 comprises adjacently disposed two pipes 15a and 15b which are straddled by a plurality of substantialy U-shaped curved strips 15c on one side of both pipes 15a and 15b, and this fitting 15 as a whole is integrally formed with an appropriate medium hard or hard synthetic resin material. The U-shape strips 15c which connect the pipes 15a and 15b conveniently permit a door to be opened through an angle of 180 degrees without causing the frame of the door to be brought into engagement with the projection 6 of the frames.

Figure 7D:
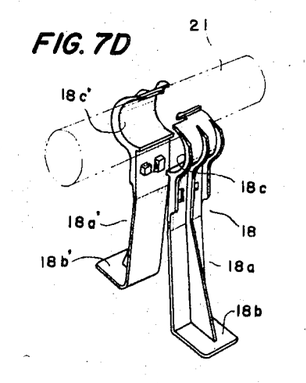
FIG. 7D is a perspective view, exploded and in an enlarged scale, showing leg members indicated at $d$ in FIGS. 5 and 6 for supporting and fixing the small size construction with respect to the ground.
Figures 7E, 7F, 7G:
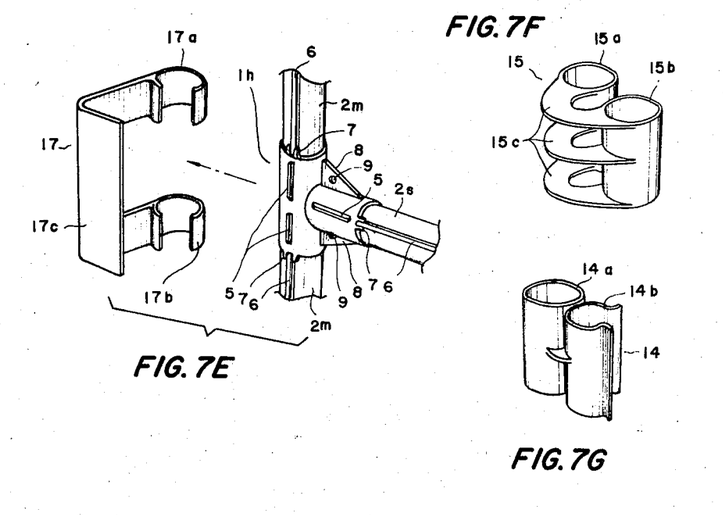
FIG. 7E is a perspective view, in an enlarged scale, showing a handle of a type which is different from the one shown in FIG. 7A.
FIG. 7F is a perspective view, in an enlarged scale, of the concurrent joint and shaft-fixing member shown in FIG. 7C.
FIG. 7G is a perspective view, in an enlarged scale, of the fixing fitting shown in FIG. 7B.
Figure 17A:
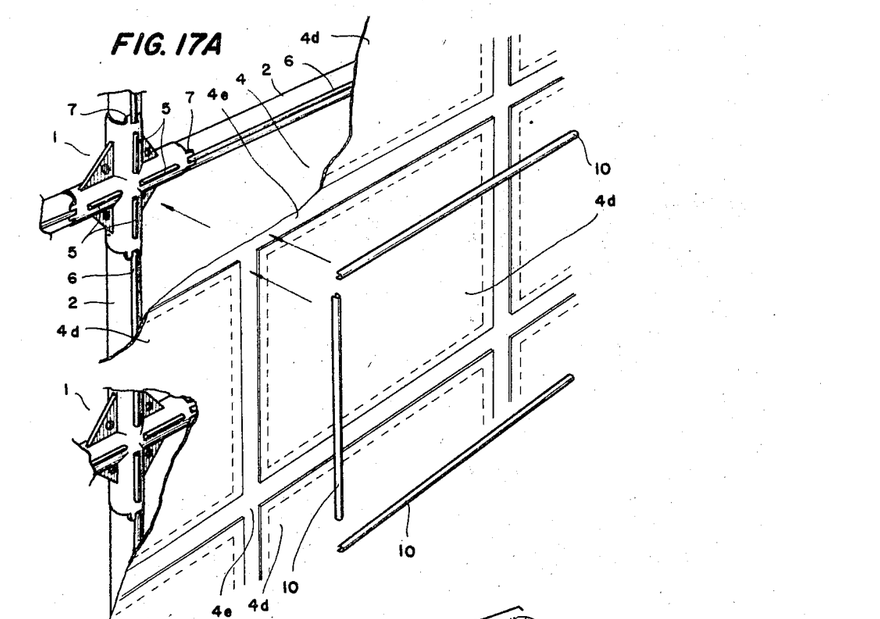

As seen clearly in FIG. 6, reference numeral 16 represents a ventilation window detachably disposed below the point of intersection of the principal rafter pipes 2a, 2a and a ridge-pole pipe 2b, and above the cross frame pipe 2e. Said ventilation window is integrally formed with a synthetic resin material. Numeral 17 shown in FIG. 17A represents a handle provided for the door 12. Another embodiment of the handle is shown in FIG. 7E, which comprises two holding members 17a and 17b which serve as the legs and their extensions join together to form a continuous and bent surface of a handle portion 17c. This handle as a whole is integrally formed with an appropriate medium hard or hard synthetic resin material. The type of the handle may be selected for attachment as required by the user.

As seen at d in FIGS. 5 and 6, reference numeral 18 is a leg unit for fixing a base pipe 2i to the ground, and this leg unit comprises a pair of leg members formed with strips 18a and 18a' for being buried under ground, each of the leg members being provided with a semi-cylindrical head portion having a outwardly curved face so as to receive, when placed together in abutment, a base pipe 2i therein, and also provided with a ground-engaging member 18b, and another one 18b' for the other of the pair, said ground-engaging member being outwardly bent from the lower end of the strip to extend horizontally therefrom for being anchored at an appropriate level under ground. Engaging means are provided on the upper marginal abutting edges of the semi-plurality head portions of said pair of strips and also a plurality of another engaging means of a different type are formed on the internal abutting surfaces of said strips below said semi-cylindrical head portions, both of said engaging means are so formed that they are brought into or out of engagement with or from each other transversewise relative to the longitudinal or the vertical extension of the strips. Each of said strips is also provided, centrally along the longitudinal exterior side thereof, with a reinforcement rib reaching into the surface of the ground-engaging member, and a plurality of reinforcement ribs two of which being disposed along the external surface at both lateral edges of the semi-cylindrical head portion and extending to the adjacent surface of the strip proper, and the remaining rib or ribs are disposed between said two edge ribs in parallel relation thereto. Each member of the leg unit having the aforedescribed structure is moulded, by the known extrusion technique as a single integral body, with an appropriate medium hard or hard synthetic resin material. As such, these strips 18a and 18a' which are identical in shape and which are anchored underground can be produced in a large member. By simply combining them together to produce an engagement therebetween and by anchoring the lower portion of the strips underground, one can attain the purpose of fixing the base cross pipes of the small size construction of the present invention. In addition to the advantages that the leg unit is simple in structure and is suitable for mass production at a low cost, it provides the following conveniences. Specifically, the assembled leg unit allows the cross base pipe 2i to be mounted therethrough in the axial direction of base pipe 2i, and also, in case the base pipe 2i is already a part of a fabricated construction, the base pipe 2i can be placed in place in said leg unit by using separate leg members in such manner to hold the base pipe between the respective head portions of the strips and then the strips are brought into positive engagement to form a firm and fixed leg for supporting the base pipe. Furthermore, by buring the leg unit underground or in concrete foundation, the ground-engaging members of the leg enable the leg unit to be securely fixed to the ground or to the concrete foundation, with a result that the base pipe is fixed securely supported by the leg unit on the ground.

As shown in an enlarged scale in FIG. 11, reference numeral 19 represents a coupling joint member made of a synthetic resin material for coupling and fixing, for example, an inclined pipe 2q or a brace pipe 2r with an eaves pipe 21 and also with a pillar pipe 2k, or with an auxiliary base pipe 2j and also with a pillar pipe 2k, or with a pillar pipe 21 and with a reinforcement cross pipe 2s, or with appropriate pipes. This coupling joint member 19 is of a structure that a branch pipe 19b for connecting such pipe as a pipe 2q or 2r stems outwardly with a desired angle from a site between both ends of a ripped pipe which is used for holding a pipe therein. A rib 19c may be provided as required at a corner which is formed by the ripped pipe 19a and the branch pipe 19b, so as to lie in a plane defined by these two pipes. The surface of the free end portion of the branch pipe 19b is provided with a slit 19d for receiving a projection provided on the surface of the inclined pipe 2q or the brace pipe 2r near the end portions which are inserted into the branch pipe 19b. By merely rotating the inclined pipe 2q or the brace pipe 2r in said slit, casual detachment of these pipes 29 and 2r from the branch pipes is prevented positively. This coupling joint member 19 as a whole is of such a simple structure as has been described, and it is moulded integrally with an appropriate medium hard or hard synthetic resin material. By disposing this coupling joint member made of synthetic resin between a brace pipe and a principal frame pipe, casual detachment of principal frame pipes such as pillar pipe and a cross pipe from their joints can be prevented.

Figures 8, 9:
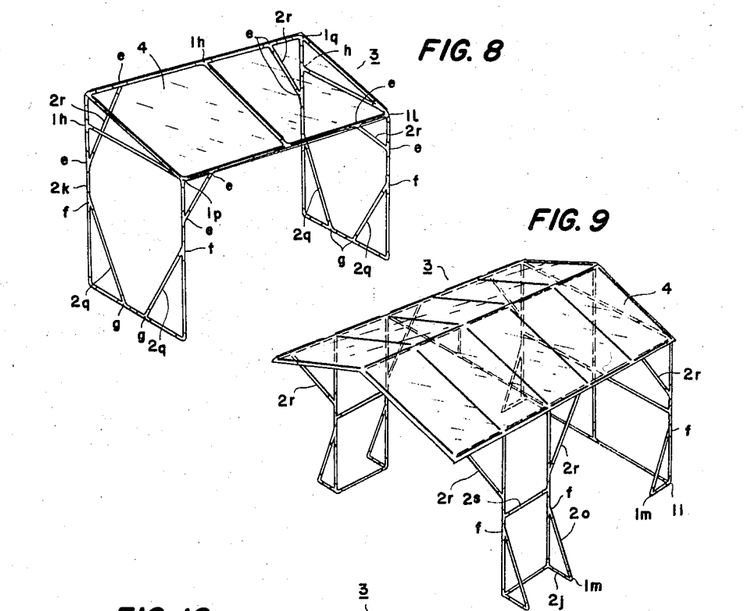
Figure 10:
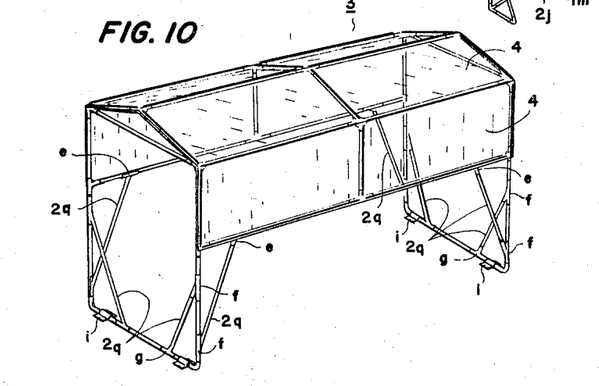
Figure 11A:
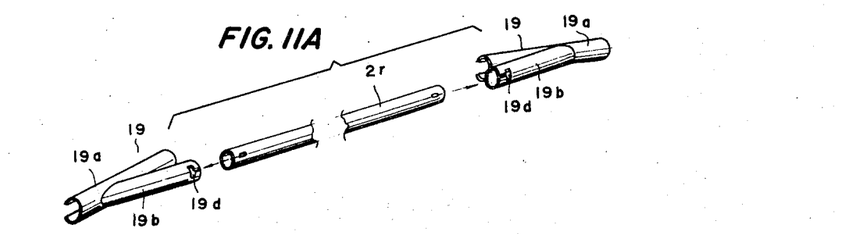
FIG. 11A is a perspective view, partly in an enlarged scale, showing the engagement between a pipe made of synthetic resin material for use as a reinforcement member such as a diagonal beam or brace and a joint member made of a synthetic resin material which is used for the attachment of said brace.
Figure 11B:
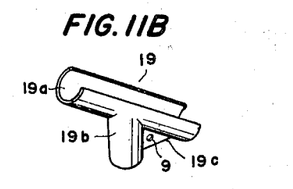
FIGS. 11B through 11E are partial perspective views in an enlarged scale, respectively, of the coupling joint members shown in FIGS 5 and 6 and FIGS 8 through 10; wherein FIG. 11B representing the coupling joint member indicated at $e$, FIG. 11C representing the coupling joint member indicated at $f$, FIG. 11D representing the coupling joint member indicated at $g$, and FIG. 11E representing the coupling joint member indicated at $h$ in the aforesaid drawings, respectively.
Figure 11C:
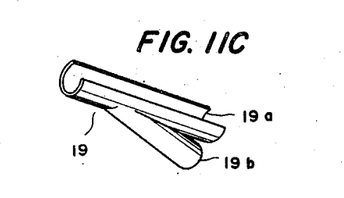
Figure 11D:
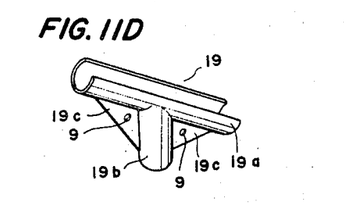
Figure 11E:
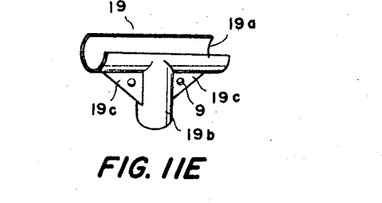
Figure 11F:
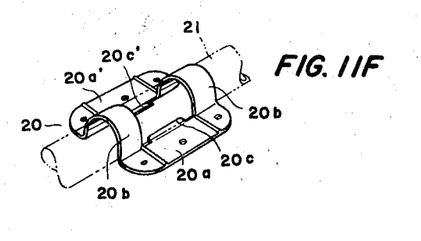
FIG. 11F is a perspective view, in an enlarged scale, showing the fixing fitting indicated at $i$ in FIG. 10.
Figure 12:
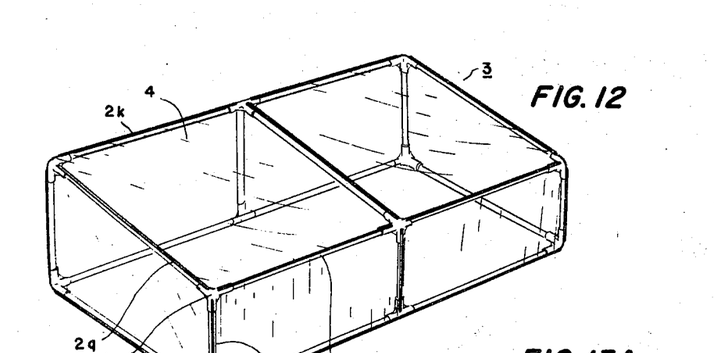

As is clearly seen in FIG. 10 and FIG. 11F, reference numeral 20 represents a fixing fitting which has been developed for fixing, for example, a base pipe 2i to a face where fixing with screws is possible, and not only that, in the case of a small size construction 3 of a terrace type as shown in FIG. 8, it can be used for fixing its pillar pipe 2k or the like which is posted in contact with a wall face of a house or the like, to a face of the wall where fixing with screws is possible. This fixing fitting 20 is of a structure comprising two flat fixing faces 20a and 20a' extending horizontally and in alignment with each other for receiving screws and a curved or semi-cylindrical central portion or a pipe holding face 20b disposed between said two flat fixing faces for receiving or holding a pipe such as 2i. This fixing fitting 20 may have the structure that the central semi-cylindrical portion is provided with a cut-out and that the resulting longitudinal internal side edges are provided with means 20c and 20c' for prevention of escaping of the pipe from said fixing fitting. This fixing fitting as a whole is moulded as an integral body with an appropriate synthetic resin material having resiliency. In order to attach this fixing fitting to a pipe, it may be pressed against a pipe from thereabove so as to hold the pipe in said semi-cylindrical portion, or a pipe may be inserted through the semi-cylindrical portion axially of the pipe to be inserted.

Figures 13A, 13B, 13C:
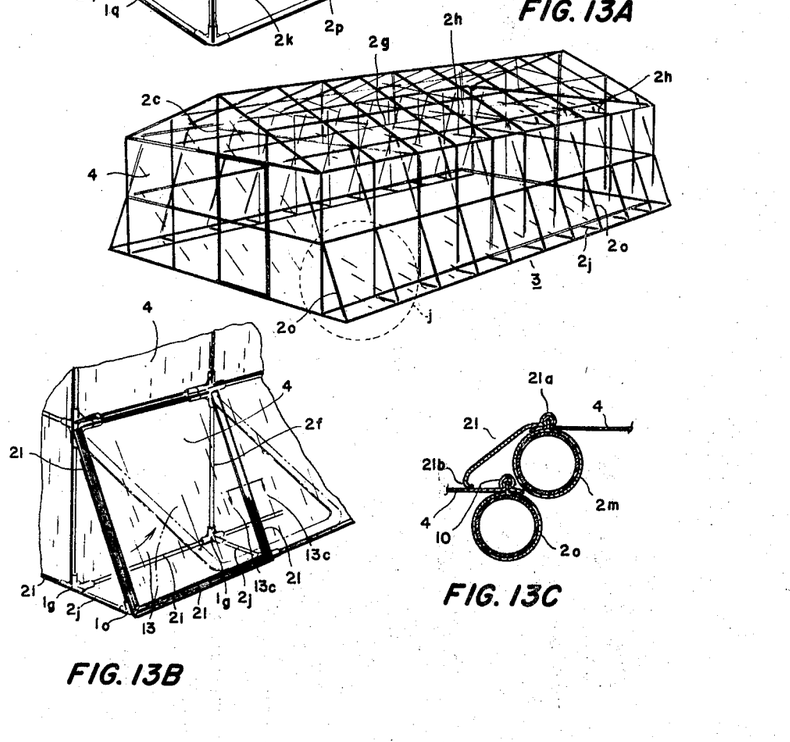

With reference to FIG. 13B and FIG. 13C, reference numerical 21 represents a cover for providing air-tightness for the peripheral edges of an openable window 13 when it is in the state of being closed. This cover is provided, at one side edge lying on the longitudinal extension, with a pressure-engagement means 21a for fixing a covering 4 by pinching said covering between a projection 5 and said pressure-engagement means 21a when this engagement means 21a is pressed against the combination of the covering 4 and the projection 5 from above said covering 4, said pressure-engaging means 21a functioning in the same fashion as the previously described fixing member 10, said cover being provided, at the opposite side-edge, with a curved portion 21b adapted to be in close engagement with said covering 4. This cover as a whole is moulded integrally with an appropriate synthetic resin material having resiliency. When this cover is attached, it is preferred that the adjacent edges be cut in the form of a picture frame and also that a plurality of them be disposed in combination, and such arrangement will further enhance the air-tightness in the interior of the small size construction 3.

Figure 14A:
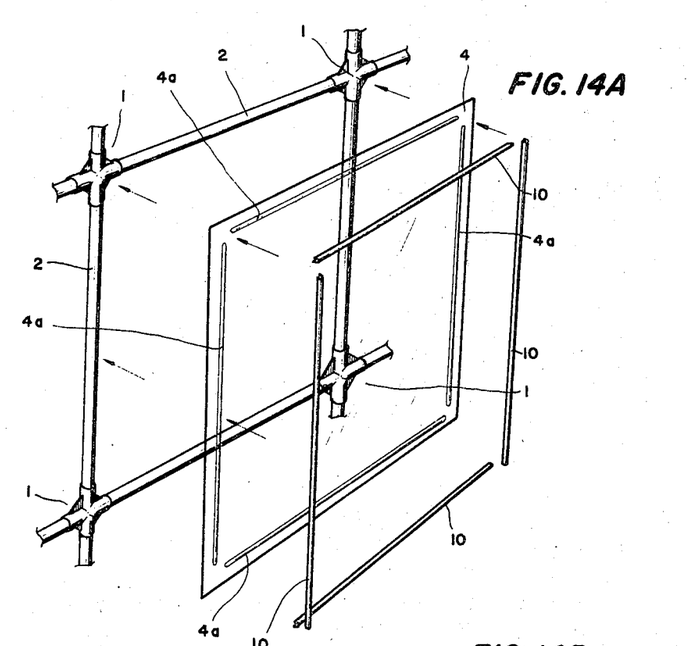
Figure 14B:
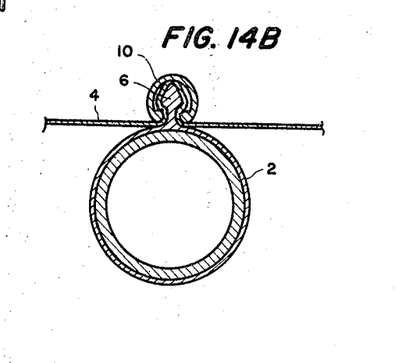

In FIG. 14, reference numeral 4a represents a mounting means provided in the face of the film-like covering 4 made of an appropriate medium hard or hard synthetic resin material. This mounting means of the covering 4 is formed by pressure-moulding technique for constantly maintaining the state of the covering being attached to the projections 5 and 6 provided on the synthetic resin pipes 2 and the synthetic joint members 1. The provision of this mounting means formed in the face of covering 4 enables the fixing member 10 to be securely and positively attached thereto.

In FIG. 15B, reference numeral 4b represents a recess or groove of a covering 4, said groove having a cross section of substantially Ω shape with the recessed portion being of a thickness greater than the other portion of the covering 4, said covering 4 being in a sheet form comprising an appropriate synthetic resin material such as vinyl chloride resin, polyethylene resin, polystyrene resin or methacryl resin. Said groove 4b of the covering 4 is adapted to be pressed against the projection 5 or the ridge 6 of the pipe or joint member to securely receive and engage the projection or the ridge. This groove is formed integrally with the sheet-like covering 4 when moulded. This groove makes the attachment and detachment of the covering to and from the pipes and joint members quite easy.

With reference to FIG. 15C, reference numeral 4c represents a recess or groove of a different type formed in a covering 4 made of an appropriate synthetic resin material and adapted to be pressed against the projections 5 and ridges 6 of pipes and joint members of a frame so that the covering may be securely and closely held onto said frame. This groove 4c is of a cross section substantially of Ω shape which is formed integrally with the rest portions of the covering 4 by using the vacuum moulding technique or by the press moulding technique or other suitable technique at the time of moulding. Like the groove 4b, this groove 4c has an advantage that it requires no fixing member 10 for the fixing of the covering 4.

FIG. 16 illustrates an arrangement for attaching a covering 4 to a frame comprising pipes 2 made of a synthetic resin material and having holding grooves 22 which are coupled together by joint members 1 made of a synthetic resin material. This arrangement comprises a holding groove 22 having resilient face to resist escaping of the inserted article, said groove 22 being formed on the face onto which a covering 4 is attached of a frame comprising synthetic resin pipes 1 and synthetic resin joints 1 coupled together. The covering 4 in this instance is provided with a mounting fitting 23 having a single bulging head 23b and disposed along the portions of the covering 4 which are to be attached to said frame by inserting the bulging head 23b into said groove 22, or said mounting fitting 23 may comprise two split bulging heads 23′ and 23′ which cooperate with each other to prevent their casual escaping from the groove by individually engaging the groove. Said pipe 2 having a groove 22 is moulded as an integral body with an appropriate synthetic resin having resiliency.

Said covering 4 in this instance may be in the form of a film sheet or plate or board having an appropriate thickness made of an appropriate synthetic resin material and may be transparent, translucent or opaque, and may contain a reinforcement material such as a metal wire net.

The foresaid holding groove 22 may be of a structure comprising oppositely disposed, two elongated resilient protruding lugs extending longitudinally of the pipes 2 made of a synthetic resin material on the faces of the pipes onto which a covering 4 is attached of a frame formed by coupling said pipes with point members 1 made also of a synthetic material, said lugs forming, in combination, a groove such that the article inserted between said lugs will not casually slip out of the groove formed by these lugs. The holding lugs and the pipe or joint member are preferably moulded as an integral body with an appropriate synthetic resin material.

The aforesaid mounting fitting 23 comprises a straightly extending vertical portion having a bulging head 23b which is mounted under pressure into the groove 22, and a horizontally extending portion 23a extending normal with respect to said vertical portion. The bulging head of said mounting fitting 23 may have split mounting heads 23′ and 23′ which are of a shape to match the configuration of the holding groove so that each of the split heads may be able to utilize or share a single holding groove. Said horizontally extending portion 23a is preferably formed so as to bend in the direction of the face of the covering 4 from the vertical portion. In case the marginal edges of the covering 4 are securely attached to the frame by means of a mounting fitting which comprises two split bulging heads, it is preferred to use, in combination, a stopping member 23″ having a structure corresponding to one of the bulging heads but having no horizontal portion 23a, as shown in FIG. 16C.

In the drawings, the bulging heads 23b are shown in a substantially spherical shape, but preferably the bulging heads are provided with a non-swivel means. Although in the drawings the cover 4 is shown to be attached to the inner face of the horizontal portion 23a, but it is to be understood that the covering 4 may be attached to the outer face of the horizontal portion 23a. The attachment of the covering 4 to the horizontal portion 23a may be effected by utilizing high frequency technique or by the use of an appropriate adhesive. The mounting fittings which are provided on appropriate site of the face, such as long the edges or between the side edges, of the covering 4 permit the covering to be attached on a frame on which holding grooves are formed, by merely pressing the mounting fittings into the grooves. This arrangement enables the covering 4 to be quite readily attached to the frame without adopting conventional attaching technique which uses nails or screws. Alternatively, the covering 4 having no formation of mounting fittings may be placed on the frame provided with holding grooves and separate mounting fittings may be pressed against the covering 4 so as to be inserted into said grooves, and satisfactory attachment of the covering to the frame is obtained by this simple procedure.

Figure 17B:
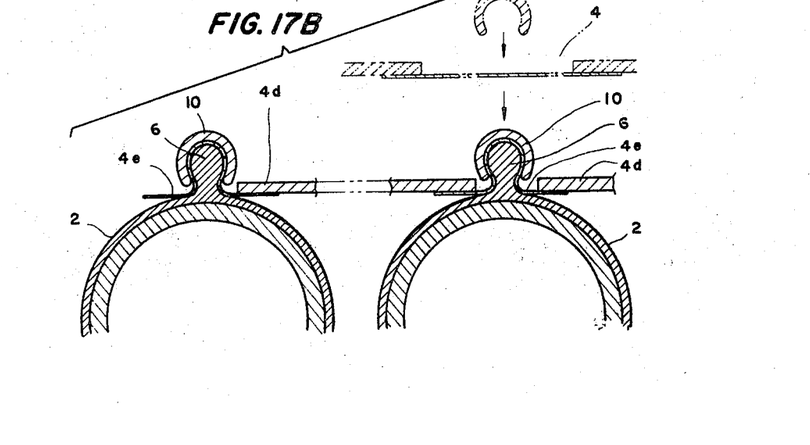

FIG. 17 shows an improved modification of the covering 4. The covering of this instance comprises a plurality of sheet or board-like material 4d having an appropriate shape and made of an appropriate synthetic resin material such as vinyl chloride resin or polyethylene resin, and also comprises a plurality of sheets 4e made of an appropriate softer synthetic resin material which are formed to be the continuous extensions of the aforesaid boards 4d and to be located between the boards 4d by means of the high frequency technique or other suitable technique. Said portions of the sheet 4e is placed on the projections 5 of the pipes and on the ridges 6 of the joint members constituting a frame, and fixing members 10 are pressed against the aforesaid sheet 4e at the site corresponding to said projections and ridges of the frame members. Said board 4d is cut into a shape to match the space defined by the synthetic resin pipes and the synthetic resin joint members which in combination constitute a frame, and this board 4d is continuously connected to adjacent sheets 4e made of a synthetic resin material, so that each of said sheets 4e is easily and securely pinched between the projections or ridges both of which have a bulging head-like cross section and the fixing members which are given an appropriate configuration to permit secure engagement with said projections and ridges. Thus, a positive attachment of the covering 4 is produced so as to form a firm, strong wall of covering. The boards can thus be cut into a shape to match the shape of the framework of the small size construction. By forming a continuous wall with these boards 4d and sheets 4e, and by attaching such walls around the framework of the construction, there are provided walls of coverings which produce perfect enclosed state of a small size construction. When it is intended to transport the continuous combination of boards and sheets, it is only necessary to fold the combination by utilizing the portions of the sheets 4e which are softer than the board portions, into a compact shape which is easy to carry. Also, by providing the sheets with a width sufficient to permit the sheets to bend to follow the configuration of the ribs, an ideal wall having no portion of constriction or crease is obtained.

Description will next be directed to a small size construction 3 which is formed by various selective combination of the aforesaid component members. With reference to FIG. 5 which shows one embodiment, a small size construction 3 is obtained by assembling the following members, namely, a series of pipes 2 made of a synthetic resin material and cut in advance into respective component members; a series of joint members 1 made also of a synthetic resin material: 2 pieces of 1a, one piece of 1c, 2 pieces of 1d, 2 pieces of 1e, 9 pieces of 1h, 4 pieces of 1i, 4 pieces of 1j, 10 pieces of 1k, 2 pieces of 1l, 2 pieces of 1n and 2 pieces of 1p; and 2 pieces of shaft-fixing joint members 11; 2 pieces of fixing fittings 14 for use in closing a door; 4 pieces of shaft-fixing coupling fittings 15; one piece of handle 17; at least 4 pieces each of leg units 18 or fixing fittings 20; 8 pieces of coupling joint members 19 made of a synthetic resin material; 2 pieces of skylight window opening means 24; and coverings 4. By assembling these members, a small size constructions 3 as shown in FIG. 5 of the drawings can be obtained. With respect to FIG. 6 of the drawings, a small size construction which can be utilized as a small house for resort areas, a storage closet, or a green house for growing plants and vegetables, such as the one shown in FIG. 6 is obtained by assembling the following members; a plurality of pipes 2 made of a synthetic resin material cut and prepared in advance into respective component members; a plurality of joint members 1 made of a synthetic resin material: 1 piece of 1a, 1 piece of 1b, 2 pieces of 1d, 6 pieces of 1e, 3 pieces of 1g, 8 pieces of 1h, 4 pieces of 1i, 4 pieces of 1j, 8 pieces of 1k, 2 pieces of 1l, 2 pieces of 1p; 4 pieces of fixing fittings 14 for use in closing a door; 1 ventilating window 16; 1 piece of handle; at least 4 pieces each of leg units or fixing fittings 20; and mounting members 10 when required; and coverings 4 made of a synthetic resin material.

With respect to FIG. 8 of the drawings, a small size construction 3 which can be used as a sunlight-rain-shed terrace as illustrated is obtained by assembling the following members: a plurality of pipes 2 made of a synthetic resin material cut in advance into the respective component members; a plurality of joint members 1 made of a synthetic resin material: 4 pieces of 1h, 4 pieces of 1k, 1 piece of 1l, 1 piece of 1p, 2 pieces of 1q; 8 pieces of fixing fittings 20; 4 pieces of leg units 18; 16 pieces of coupling joint members 19 made of a synthetic resin material; coverings 4 made of a synthetic resin material; and mounting members 10 when necessary.

By referring to FIG. 9 of the drawings, a small size construction 3 which is utilized as a garage or the like as illustrated is obtained by assembling the following members: a plurality of pipes 2 made of a synthetic resin material which are cut in advance into the lengths required for the respective component members; a plurality of joint members 1 made also of a synthetic resin material: 1 piece each of 1a, 1b and 1c; 3 pieces of 1d, 2 pieces of 1e, 12 pieces of 1h, 6 pieces of 1i, 2 pieces of 1j, 2 pieces of 1k, 1 piece of 1l, 6 pieces of 1m, 2 pieces of 1n, and 1 piece of 1p; at least 10 pieces each of leg units 18 and fixing fittings 20; 18 pieces or more of coupling joining members made of a synthetic resin material; covering 4; and mounting members 10 are required.

In connection with FIG. 10 of the drawings, a small size construction 3 which can be used as a laundry shed for drying laundries or the like as illustrated is obtained by assembling the following members: a plurality of pipes 2 made of a synthetic resin material which are cut in advance into the size of the respective component members; a plurality of joint members 1 made also of a synthetic resin material: 2 pieces of 1b, 1 piece of 1d, 6 pieces of 1h, 2 pieces of 1j, 4 pieces of 1k, 2 pieces of 1l, and 2 pieces of 1p; 16 pieces of coupling joint members 19 made of a synthetic resin material; at least 4 pieces of leg units 18 or fixing fittings 20; coverings 4; and mounting members 10 when required.

As has been discussed in detail, the present invention provides, each in one-kit, those members required for the fabrication of a small size construction 3 which is designed in a desired form. The user can select a kit which suits his purpose from among a variety of types of kits, and he can readily build up a small size construction as has been designed as well as can dismantle the construction readily when it is so desired. The size of the construction can be altered, that is, expanded or reduced, by simply attaching additional members of thhe pipes made of a synthetic resin material and also additional joint members 1 made also of a synthetic resin material by selecting them to suit the design of the planned expansion, or the construction 3 can be reduced in size by removing some of the pipes 2 and the joint members 1 as planned. In case, however, it is intended that the construction be used continuously for an extended period of time, the joint surface portions of the pipes 2 made of a synthetic resin material and the joint members 1 made also of a synthetic resin material may be bonded together by the use of an adhesive or a bonding agent.

In view of the fact that all of the component members of the small size construction 3 are made of a synthetic resin material, they are light in weight, and in addition, they are of a satisfactory resistance to weather, moisture and use of long duration.

The numerous features and advantages of the present invention should have been well understood by reading the foregoing detailed descriptions. It should be understood that various modifications, alterations and improvements of the present invention can be made with respect to the shape, structure and arrangement without departing from the spirit of the present invention, and also that the embodiments and illustrations given in the specification as well as in the drawings are given simply for the purpose of illustrating some of the embodiments of the present invention and that the present invention is not restricted thereto.

What is claimed is:

1. In a readily demountable construction including a joint member having a socket, an elongated frame member removably inserted in said socket, a sheet covering removably secured to said frame member and said joint member and a fixing means clamping said sheet covering to both said frame member and said joint member, the improvement comprising:

an elongated ridge aligned longitudinally on the socket of said joint member and terminating short of the terminal end of said socket, non-swivel means on the terminal end of said socket comprising an elongated notch, at least a portion of said notch being aligned with said elongated ridge, said elongated frame member being provided with a longitudinal elongated projection terminating short of the terminal end of said frame member, said longitudinal projection interlocking with the portion of said elongated notch which is aligned with said elongated ridge upon the insertion of the terminal end of said frame member in said socket, said elongated projection and said elongated ridge having a cross-section defined by a head and neck configuration, the marginal portions of said sheet covering overlying said elongated ridge and said elongated projection and conforming to the head and neck configuration thereof and, said fixing means comprising an elongated resilient clamp of generally C-shaped cross-section resiliently overlying and interlocking with the elongated ridge and the elongated projection and clamping said sheet covering therebetween.

2. The combination of structure as recited in claim 1 wherein said joint member, said frame member, and said fixing means being formed of a molded resinous material, said elongated ridge being formed integrally on said joint member and, said elongated projection being formed integrally on said frame member.

References Cited

UNITED STATES PATENTS

| | | | |
|---|---|---|---|
| 988,446 | 4/1911 | Davis | 135—3 |
| 1,610,801 | 12/1926 | McKinnon | 135—3 |
| 2,547,692 | 4/1951 | D'Azzo | 160—392 X |
| 2,704,522 | 3/1955 | Frieder et al. | 135—3 X |
| 2,810,390 | 10/1957 | Wallace et al. | 135—3 |
| 2,818,875 | 1/1958 | Denn | 135—3 |
| 2,823,683 | 2/1958 | Smith et al. | 135—3 X |
| 3,058,518 | 10/1962 | Housman | 160—402 X |
| 3,080,875 | 3/1963 | Bartlett | 135—3 X |
| 3,223,098 | 12/1965 | Dole | 135—3 X |
| 3,312,026 | 4/1967 | Rolland | 52—475 |

FOREIGN PATENTS

| | | |
|---|---|---|
| 1,264,771 | 5/1961 | France. |
| 1,269,283 | 7/1961 | France. |

PETER M. CAUN, *Primary Examiner.*

U.S. Cl. X.R.

135—3